(12) United States Patent
Giard et al.

(10) Patent No.: US 6,307,334 B1
(45) Date of Patent: Oct. 23, 2001

(54) TELEVISION RECEIVER WITH HORIZONTAL DEFLECTION CIRCUIT

(75) Inventors: Olivier Giard, Grenoble; Serge Hembert, Brie et Angonnes, both of (FR)

(73) Assignee: Thomson multimedia S.A., Boulogne (FR)

( * ) Notice: Subject to any disclaimer, the term of this patent is extended or adjusted under 35 U.S.C. 154(b) by 0 days.

(21) Appl. No.: 09/199,087

(22) Filed: Nov. 24, 1998

(30) Foreign Application Priority Data

Dec. 2, 1997 (JP) ...................................... 9-331588

(51) Int. Cl.[7] .................................................. G09G 1/04
(52) U.S. Cl. ............................................ 315/370; 315/371
(58) Field of Search ...................................... 315/370, 371, 315/379, 399; 348/533, 535, 536

(56) References Cited

U.S. PATENT DOCUMENTS

| | | | |
|---|---|---|---|
| 4,184,104 | * | 1/1980 | Shouse, Jr. ............................ 358/158 |
| 4,240,115 | * | 12/1980 | Kamiya ............................... 358/193.1 |
| 4,414,571 | * | 11/1983 | Kureha et al. ........................ 358/158 |
| 5,166,793 | * | 11/1992 | Furukawa et al. .................... 358/158 |
| 5,181,116 | * | 1/1993 | Nakagaki et al. ..................... 358/19 |
| 5,331,347 | * | 7/1994 | Wu ........................................ 348/536 |
| 5,677,743 | * | 10/1997 | Terao et al. ........................... 348/735 |
| 5,978,040 | * | 11/1999 | Diamant ................................ 348/556 |

FOREIGN PATENT DOCUMENTS

09016143A * 1/1995 (JP) ................................ G09G/3/20

* cited by examiner

*Primary Examiner*—Seungsook Ham
*Assistant Examiner*—Shun Lee
(74) *Attorney, Agent, or Firm*—Joseph S. Tripoli; Joseph J. Laks; Daniel E. Sragow

(57) ABSTRACT

In a television receiver comprising a horizontal deflection circuit (2) associated with a flyback transformer (9), the horizontal deflection circuit comprises a switch (6) which is controlled by a control signal (Hdrive) generated by a deflection control circuit (1). The deflection control circuit generates a phase difference signal (Vcomp) which is a function of the phase difference of a horizontal synchronisation pulse and a flyback pulse and generates the control signal (Hdrive) as a continuous function of the phase difference signal (Vcomp). The deflection circuit is further arranged to generate at least one discrete phase jump of the control signal (Hdrive) when the phase difference signal (Vcomp) lies outside of a range of preset values (Vlow, Vhigh).

5 Claims, 6 Drawing Sheets

LINE x

LINE x + 1

LINE x + 2

TELEVISION RECEIVER WITH HORIZONTAL DEFLECTION CIRCUIT

BACKGROUND OF THE INVENTION

1. Field of the Invention

The invention relates to a television receiver with a horizontal deflection circuit for cathode ray tube television receivers.

2. Description of the Related Art

FIG. 1 is a diagram of a control circuit 1 of a horizontal deflection circuit 2.

The deflection circuit consists mainly of a horizontal deflection yoke coil 3 connected in parallel with a retrace capacitor 4, a yoke-current damper diode 5 and a NPN bipolar transistor 6 acting as horizontal output device. The emitter of transistor 6 and the anode of diode 5 are connected to ground.

The collector of transistor 6 is connected to a supply voltage 7 through the primary winding 8 of a flyback transformer 9. The secondary high voltage winding 10 of the flyback transformer 9 generates voltage pulses ('horizontal flyback pulses') supplying the cathode ray tube anode (not illustrated).

The base of transistor 6 is connected to an output of the integrated circuit 1 and is controlled by a horizontal deflection control signal referenced "Hdrive inverse".

The integrated circuit 1 synchronizes horizontal synchronization pulses in the video signal and the horizontal flyback pulses. It includes a comparator 11 comparing two signals, Vsaw and Vcomp. The former is derived from the horizontal synchronization pulses (through a signal referenced PHI2tb), while the latter is derived from the horizontal flyback pulses and the horizontal synchronization pulses (through a signal referenced PHI2ref).

PHI2ref is generated by a decoder from an n-bit counter which is reinitialised by the leading edge of a horizontal synchronization pulse in the video signal. The decoder is programmed so that the signal has a cyclic ratio of approximately 50%, but another ratio is possible.

PHI2tb is generated by a logic circuit which will be explained in more detail later on in relation with FIG. 6. It contains pulses of a frequency which is approximately the double of the line frequency.

A signal HFLYInt is generated from the horizontal flyback pulses by a hysteresis comparator 12, which generates a step signal for the duration of each flyback pulse. The use of hysteresis reduces the influence of noise.

The signals HFLYint and PHI2ref are compared by a phase comparator 13 to yield a control signal of a charge pump 14. The charge pump 14 charges or discharges a capacitor 15. The voltage on this capacitor is the signal Vcomp, which is fed to the negative input of comparator 11.

PHI2tb is fed to the 'Set' input of an RS-latch 16. The output 'Q inverse' of latch 16 controls the state of a switch 17. A current source 18 loads a capacitor 19 with a constant current. When closed, switch 17 connects the middle point between current source 18 and capacitor 19 to ground, unloading capacitor 19. The switch is open when Q inverse is set. The signal at this middle point is the signal Vsaw, which is fed to the positive input of comparator 11.

The middle point is also connected to the negative input of a comparator 20, which compares Vsaw to a constant voltage V. The output of this comparator 20 resets the RS-latch 16.

The output of Vsaw/Vcomp comparator 11 is fed to a control logic and reshape circuit 21, whose output is the signal Hdrive inverse driving the base of transistor 6. The function of the circuit 21 is, among other tasks, to transform its input signal into a step signal.

The operation of the control circuit 1 of FIG. 1 can be explained with the help of the diagrams of FIGS. 2 and 3.

FIG. 2 shows from top to bottom the control signal Hdrive of transistor 6, the current "I" in the deflection yoke and the flyback voltage "V fly back". Hdrive is inverted (Hdrive inverse) to control the base of NPN transistor 6. Interval A represents the line tracing interval, while interval B represents the horizontal blanking interval or flyback interval. During interval A, the yoke current I increases linearly. For negative values of I, the damper diode 5 conducts, while for positive values, the transistor 6 conducts. Interval C represents the signal on the base of the transistor. To allow proper current establishment, the active part (step C) of signal Hdrive is in advance on the instant at which the current I changes polarity. Interval D corresponds to the storage time of the transistor.

The horizontal synchronization pulses of a composite video baseband signal (CVBS) trigger the leading edge of a pulse in the signal PHI2ref, which should be in phase with the maximum of the horizontal flyback pulses as illustrated. The diagrams of FIG. 3 represent the signals when in-phase status is achieved.

Rising edges on PHI2tb trigger charging of capacitor 19 by current source 18. This is the constant positive slope X of the sawtooth of signal Vsaw. When Vsaw reaches the voltage level V, the RS-latch is reset, and switch 17 closed, which leads to a rapid drop to ground of the voltage stored in the capacitor 19. Follows a period during which the stored voltage remains at ground, until another rising edge on PHI2tb sets the RS-latch 16 anew.

Comparator 11 outputs a zero-to-one transition each time when Vsaw becomes greater than Vcomp. The first zero-toone transition triggers the active Hdrive step through circuit 21, while the second zero-to-one transition resets this signal to its inactive state. It can be seen immediately that the variation of the Vcomp comparison level will cause a phase change of the active Hdrive step.

The Vcomp signal is adjusted in the following manner. Charge pump 14 is active only during flyback pulses (existence of step pulse in HFLYint) and charges capacitor 15 starting from the leading edge of HFLYint, until the leading edge of PHI2ref. From that instant on until the end of the flyback pulse, capacitor is discharged. Charging and discharging currents have same intensity.

When the flyback pulse is centered on the leading edge of PHI2ref, the charging and discharging times are equal. Consequently, the voltage level of Vcomp before and after a pulse remains the same.

This is not true when the leading edge of PHI2ref is not in phase with the flyback pulse as described in the previous paragraph. When the pulse is in advance of PHI2ref, capacitor 15 will be charged a longer time: the Vcomp comparison level will increase, causing a delay of the Hdrive step (shift to the right on the diagram), thus retarding the flyback pulse. Conversely, the flyback pulse is advanced when the Vcomp comparison level is reduced.

Two sawteeth, X and Y, are shown on FIG. 4. The rising slope of sawtooth X is the same slope as on FIG. 3. Noise present on the slope induces a jitter on the triggering of the active Hdrive step, as illustrated. Due to the presence of noise, the Hdrive step may be triggered too early or to late.

The inventors have noted that a steeper slope X or Y will reduce the influence of noise on the jitter of the Hdrive signal, but that a steeper slope will also reduce the maximum amplitude of phase correction: it can be seen on FIG. 4 that the maximum correction Phi2 is greater than the maximum correction Phi1.

SUMMARY OF THE INVENTION

The object of the invention is to propose a device which permits noise reduction while at the same time maintaining the phase correction amplitude.

The invention concerns a television receiver comprising a horizontal deflection circuit associated with a flyback transformer. The horizontal deflection circuit is controlled by a deflection control circuit and comprises a switch, the deflection control circuit comprising:

- a generator of a phase difference signal which is a function of the phase difference of a horizontal synchronisation pulse and a flyback pulse;
- a generator of a control signal of the switch as a continuous function of the phase difference signal; and
- a generator of a at least one discrete phase jump of the control signal when the phase difference signal lies outside of a range of values.

Since the duration of the slope of a sawtooth determines the maximum amount of the continuous phase correction on the control signal of transistor 6, it is proposed to include a generator of discrete phase jumps of the sawtooth, and thus of the control signal, in case the capacity of the continuous phase correction is exceeded.

Thus, steeper slopes can be used for the sawtooth signals, resulting in less jitter on the transistor (switch) control signal, without impairing the global phase correction.

According to an embodiment of the invention, the generator of the control signal of the switch comprises a sawtooth signal generator and a comparator between the sawtooth signal and the phase difference signal, the generation of the sawteeth of said sawtooth signal being triggered at given time intervals after a horizontal synchronization pulse.

According to an embodiment of the invention, a discrete phase jump is introduced by incrementing the given time intervals by a given value.

According to an embodiment of the invention, the magnitude of the phase jump is smaller than the duration of the slope of a sawtooth.

According to an embodiment of the invention, the generator of at least one phase jump has the behaviour of a hysteresis loop.

BRIEF DESCRIPTION OF THE DRAWINGS

Other characteristics and advantages of the invention will become apparent through the description of a non-limiting embodiment. The embodiment is illustrated by the enclosed figures, among which.

DESCRIPTION OF THE PREFERRED EMBODIMENT

Figure 4:
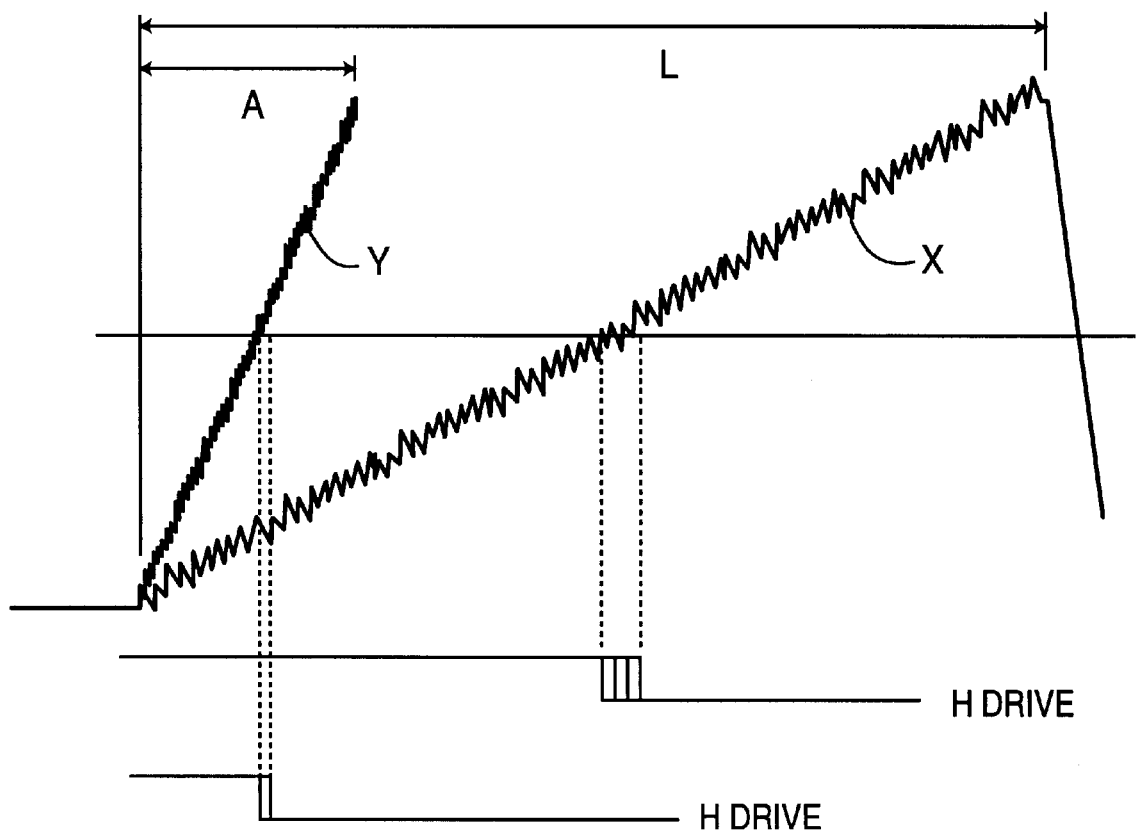
FIG. 4 is a diagram illustrating the influence of noise in the generation of a horizontal deflection control signal, and how this influence can be reduced.

It has been observed that the gentler the rising slope, the greater the amplitude of jitter due to noise of a given amplitude. Consequently, an increase of the steepness of the slope, as illustrated by slope of signal Y in comparison to slope of signal X of FIG. 4, leads to a reduced jitter amplitude.

If the steepness of the rising slope is to be increased, the triggering of such a slope by PHI2tb has to be modified in order for the Hdrive signal to be properly generated. The problem is that the amplitude of the phase correction of the Hdrive step also diminishes with the steepness of the positive sawtooth slope. The phase correction may become insufficient in some circumstances.

According to the present embodiment, the steepness of the sawteeth slopes is increased, and a supplementary phase correction is added to the sawteeth.

The steepness of the slopes can be increased simply by increasing the intensity of the current of current source 18.

Figure 5:
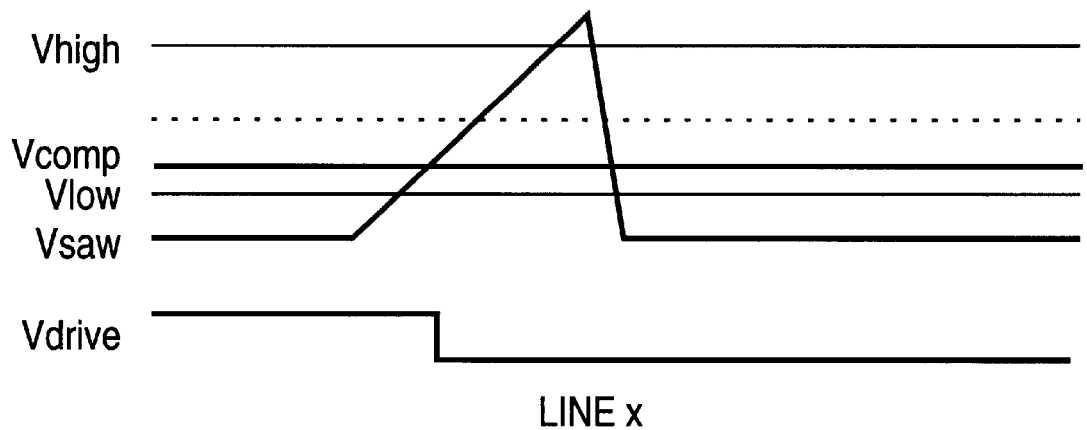
FIG. 5 is a diagram of signals in the circuit according to the embodiment of the invention.
Figure 5:
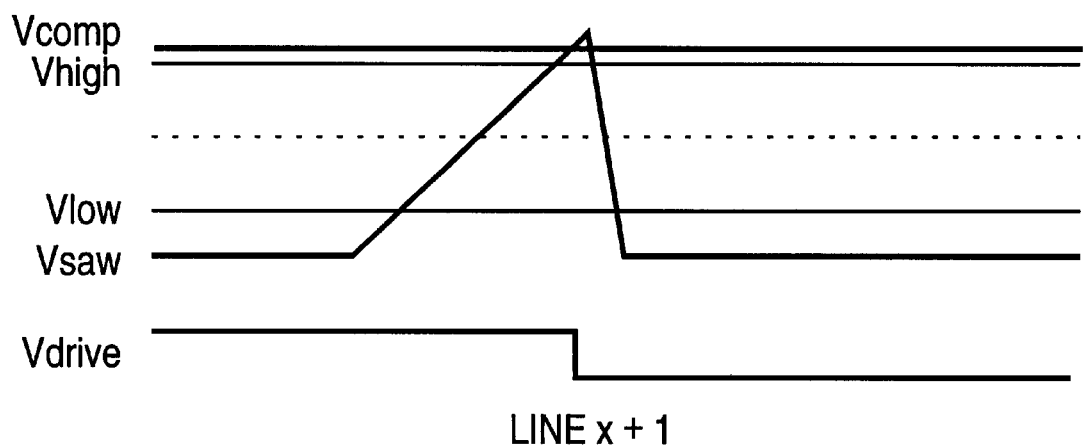
Figure 5:
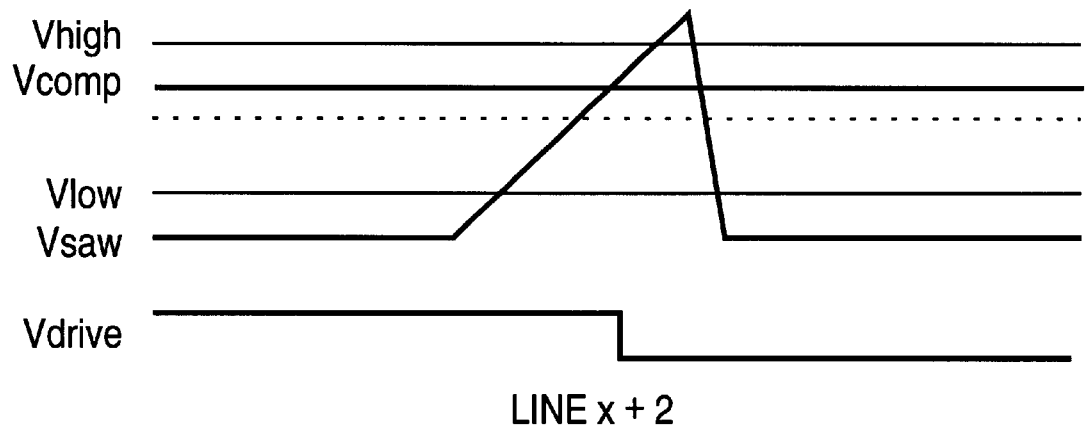

The principle of the discrete phase correction is illustrated by the diagram of FIG. 5. The slopes drawn in dotted lines show all possible discrete positions of a sawtooth, i.e. all possible discrete phase adjustments. Only the first sawtooth is illustrated, the second sawtooth being always generated a constant time interval after the first sawtooth.

The discrete correction of the phase depends on the voltage Vcomp. This voltage is compared to two constant voltage levels, Vlow and Vhigh. A discrete phase adjustment is made only when Vcomp lies outside of these bounds. The normal level of Vcomp (flyback and synchronization pulses in phase) is half-way between Vlow and Vhigh. This average level is symbolized by a horizontal dash-dot line in FIG. 5.

The corresponding edge of Hdrive is drawn in dotted lines.

FIG. 5 illustrates the phase corrections for three consecutive video lines x, x+1 and x+2.

For a video line x, Vcomp lies below the average value for which no correction is necessary, but lies within the bounds defined by Vhigh and Vlow. Consequently, no phase jump is made since the normal correction of the beginning of the Hdrive active step is seen as sufficient. This normal correction consists in this case in advancing the phase of the Hdrive step as compared to its usual position (dotted lines), as illustrated.

For line x+1, the level of Vcomp moves to a value above the value Vhigh. A corresponding phase jump is programmed for the next line, i.e. x+2. For line x+1, the only correction is the normal delay of the Hdrive step introduced by the comparison between Vsaw and Vcomp. Nevertheless, the fact that Vcomp has exceeded Vhigh is memorised.

For line x+2, the start of Vsaw is delayed by a discrete amount of time (which corresponds to the phase jump), by acting on the generation of the first pulse of PHI2tb. FIG. 5 illustrates the case where the normal correction made during line x+1 brings back Vcomp to a value lying between the two bounds Vhigh and Vlow. In this case, there is no further phase jump of the sawtooth: it will remain for subsequent lines at the position it has for line x+2.

If for line x+2, Vcomp still exceeds Vhigh, another discrete phase jump is introduced for line x+3.

It can be seen that the discrete phase correction has the behaviour of a hysteresis loop. Once a discrete phase jump into one direction has been made because Vcomp exceeds, respectively lies below, the upper, respectively the lower bound, a jump into the opposite direction is made only when Vcomp lies below, respectively exceeds the other bound.

The magnitude of the discrete phase jumps is a function of the magnitude of the continuous correction introduced by comparator 11, i.e. a function of the duration of the positive slope of a sawtooth. Phase jumps are chosen in such a way that there is an overlap between the positive slopes of two consecutive sawteeth, so as to avoid gaps in the phase correction.

Figure 1:
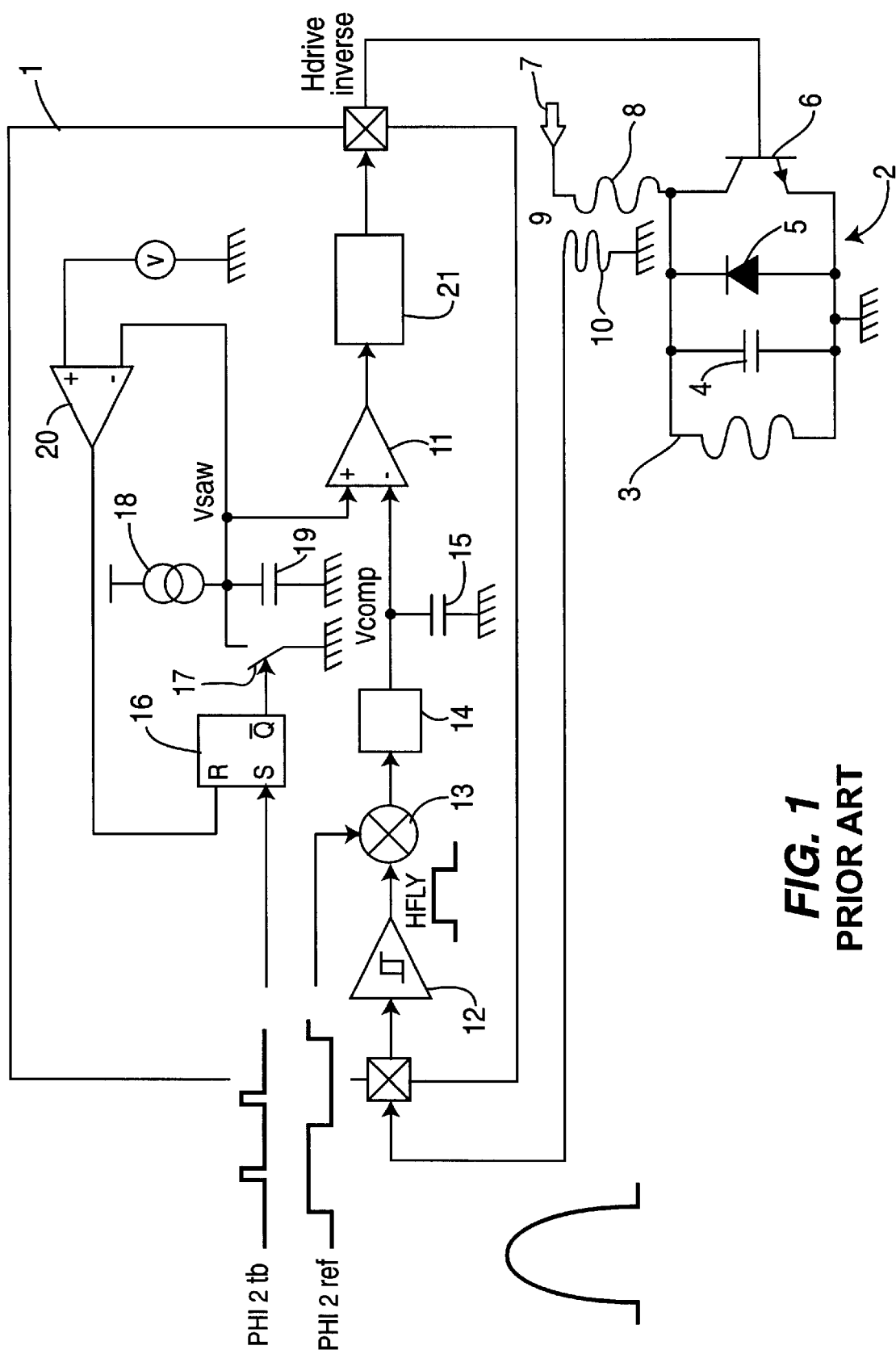
FIG. 1 is a prior art horizontal deflection circuit.
Figure 2:
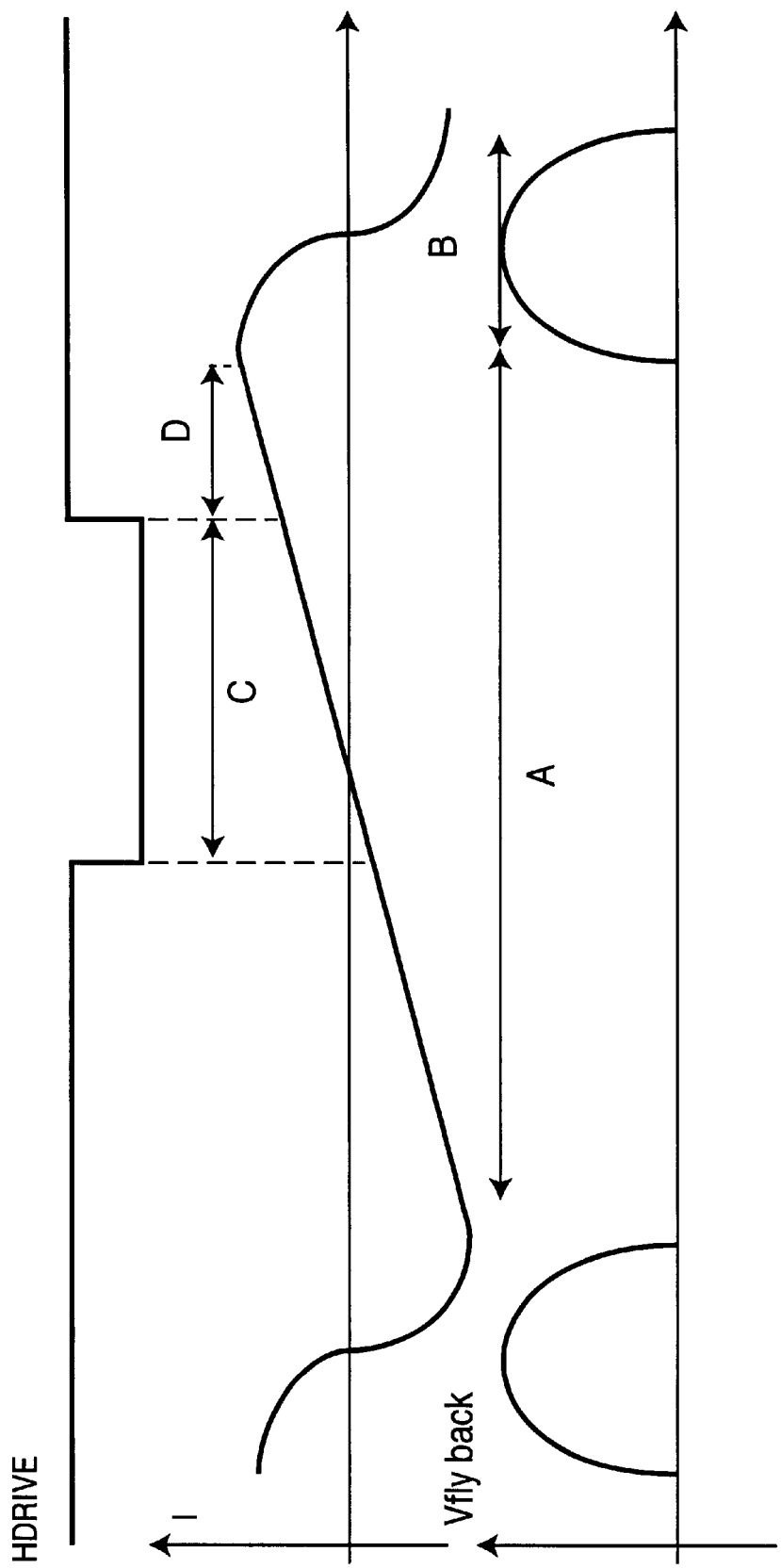
FIG. 2 is a first diagram illustrating signals in the circuit of FIG. 1.
Figure 3:
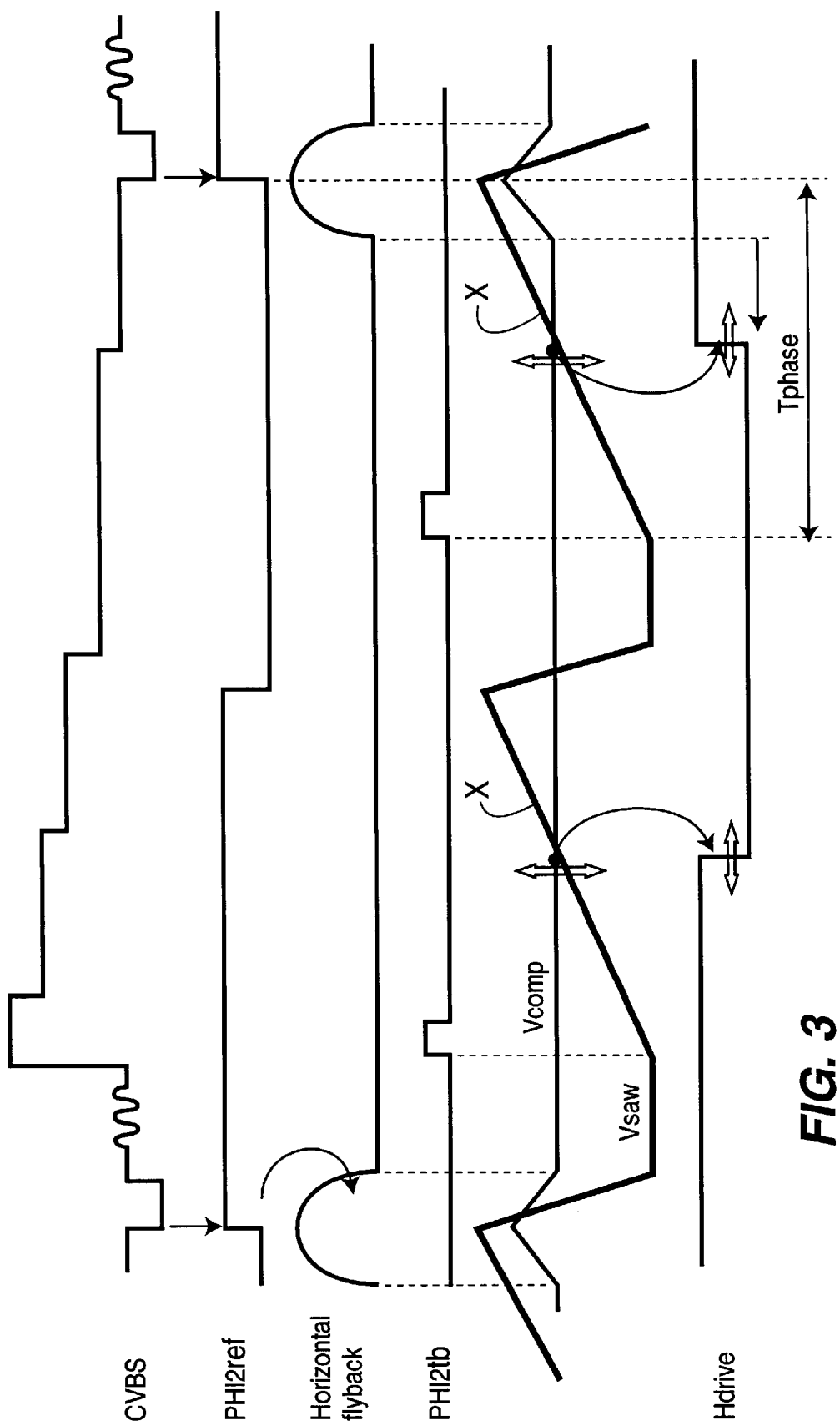
FIG. 3 is a second diagram illustrating signals in the circuit of FIG. 1.
Figure 6:
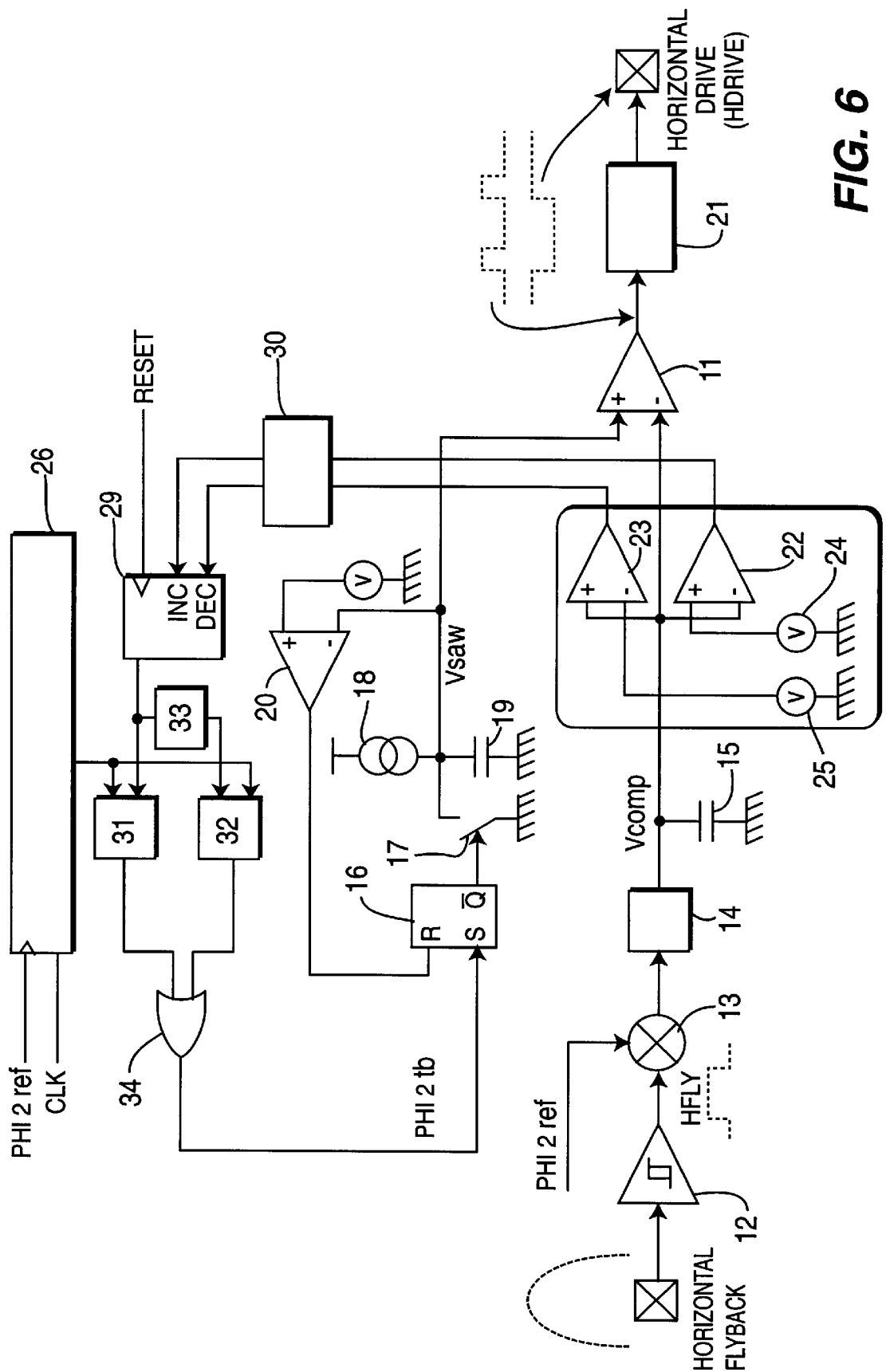
FIG. 6 is a circuit according to the present embodiment of the invention.

FIG. 6 is a diagram of a circuit according to the present invention and will be used to explain how the discrete phase jumps are generated. References in this figure which are identical to those of FIG. 1 correspond to similar elements.

The circuit of FIG. 6 comprises two comparators 22 and 23, comparing respectively the signal Vcomp to the lower voltage limit Vlow generated by a voltage source 24, and to the upper voltage limit Vhigh generated by a voltage source 25.

The circuit further includes a pixel counter 26 clocked by a pixel clock CK and reset at the beginning of each video line by the horizontal synchronization pulse. According to the present embodiment, a video line has a duration of 32 $\mu$s (for a 100Hz system), each line comprising 864 pixels. Counter 26 is thus a 10-bit counter.

Two comparators 31 and 32 compare the content of counter 26 to two values. The first value corresponds to the state of counter 26 during which the first pulse of signal PHI2tb should exist. The second value corresponds to the state of counter 26 during which the second pulse of signal PHI2tb is supposed to exist. The leading edge of each pulse of PHI2tb triggers the slope of a sawtooth in signal Vsaw. According to the present embodiment, the second pulse is always generated 19 $\mu$s after the first pulse: the duration of the step of Hdrive is then constant. The value of 19 $\mu$s is the value chosen for the present implementation, and depends on factors such as the characteristics of transistor 6. The value can of course be different for other implementations.

The initial conditions are the following: the first pulse of PHI2tb is to be generated, in the absence of any discrete phase correction, X $\mu$s after a horizontal synch pulse, while the second pulse is to be generated 19 $\mu$s later. Each increment of counter 26 corresponds to 32/864=0.037037 . . . $\mu$s, so the counter values to be detected can be easily determined. The value X may simply be zero, or a value determined during previous runs.

To generate these two values, the circuit includes an N bit up/down counter 29. The up/down counter is incremented when a clock signal is applied to its 'Increment' (INC) input and decremented when a clock signal is applied to its 'Decrement' (DEC) input. It is reset to its original value when a signal is applied to its reset input.

A clock generator 30 receives the output signals of comparators 22 and 23. When the clock generator receives a leading edge from comparator 23, it generates a number Q of clock pulses on its output connected to the 'Decrement' input of counter 29. When the clock generator receives a leading edge from comparator 22, it generates Q clock pulses on its output connected to the 'Increment' input of counter 29.

The number Q determines the value of each discrete phase jump. In the present example, each discrete phase jump corresponds to an advance or a delay of 1 $\mu$s, i.e. 27 clock pulses. Of course, other values may be chosen.

The two comparators 31 and 32 compare the state of counter 26 to either the content of up/down counter 29, or the content of this counter to which the value 19/0.037037 . . . =513 has been added by adder 33. The outputs of comparators are combined by a two-input OR 34. The output of this OR represents the signal PHI2tb.

What is claimed is:

1. Device for a television receiver comprising a horizontal deflection circuit associated with a flyback transformer, said horizontal deflection circuit being controlled by a deflection control circuit and comprising a switch, the deflection control circuit comprising:

means for generating a phase difference signal which is a function of the phase difference of horizontal synchronization pulses and flyback pulses;

means for generating a control signal of the switch as a continuous function of the phase difference of said phase difference signal, said means for generating a control signal comprising a sawtooth signal generator and a comparator between a sawtooth signal generated by said sawtooth signal generator and the phase difference signal, the sawteeth of said sawtooth signal being triggered at given time intervals after the horizontal synchronization pulses, said control signal having a jitter amplitude;

wherein said control circuit further comprises means for generating at least one discrete phase jump of said control signal when said phase difference signal lies outside of a range of preset values;

and means for generating a triggering signal comprising pulses giving triggering times of the sawtooth signal, said means for generating a triggering signal comprising a pixel counter reset by the horizontal synchronization pulses, an up/down counter incremented or decremented of a given value corresponding to the discrete phase jump when the phase difference signal lies outside of the range of preset values, ane means for combining the outputs of the pixel counter and of the up/down counter into the triggering signal.

2. Device according to claim 1, wherein said means for combining the outputs of the pixel counter and of the up/down counter comprise:

a first comparator intended to compare a state of the pixel counter to a content of the up/down counter;

and a second comparator intended to compare said state of the pixel counter to said content of the up/down counter to which a value giving an expected delay between two pulses of the triggering signal is added.

3. Device according to claim 1, wherein said control circuit further comprises means for reducing the jitter amplitude of said control signal.

4. Device according to claim 1, wherein the magnitude of the phase jump is smaller than the duration of the slope of a sawtooth.

5. Device according to claim 1, wherein said means for generating at least one phase jump have the behaviour of a hysteresis loop.

* * * * *